(12) United States Patent
Corson

(10) Patent No.: US 9,537,310 B2
(45) Date of Patent: Jan. 3, 2017

(54) METHOD OF CONTROLLING THE OPERATION OF A HYBRID SYSTEM

(71) Applicant: Belenos Clean Power Holding AG, Bienne (CH)

(72) Inventor: Donald Corson, Yverdon-les-Bains (CH)

(73) Assignee: Belenos Clean Power Holding AG, Bienne (CH)

( * ) Notice: Subject to any disclaimer, the term of this patent is extended or adjusted under 35 U.S.C. 154(b) by 439 days.

(21) Appl. No.: 14/355,709

(22) PCT Filed: Nov. 1, 2012

(86) PCT No.: PCT/EP2012/071645
§ 371 (c)(1),
(2) Date: May 1, 2014

(87) PCT Pub. No.: WO2013/064587
PCT Pub. Date: May 10, 2013

(65) Prior Publication Data
US 2014/0292084 A1    Oct. 2, 2014

(30) Foreign Application Priority Data
Nov. 2, 2011    (EP) .................................... 11187563

(51) Int. Cl.
*H02J 1/04*     (2006.01)
*H01M 8/04*     (2016.01)
*H01M 16/00*    (2006.01)

(52) U.S. Cl.
CPC .............. *H02J 1/04* (2013.01); *H01M 8/0491* (2013.01); *H01M 8/04559* (2013.01);
(Continued)

(58) Field of Classification Search
CPC .... H02J 1/04; H01M 8/04753; H01M 16/003; H01M 8/04567; H01M 8/0491; H01M 8/04559; H01M 8/04626; H01M 16/006; Y10T 307/549; Y02E 60/50
See application file for complete search history.

(56) References Cited

U.S. PATENT DOCUMENTS

2001/0018138 A1*  8/2001  Iwase .................. B60L 11/1881
                                                       429/431
2003/0012990 A1*  1/2003  Yamanashi ......... B60L 11/1881
                                                       429/412
(Continued)

FOREIGN PATENT DOCUMENTS

EP    2 192 647 A1    6/2010
EP    2 241 473 A1    10/2010
EP    2 320 504 A1    5/2011

OTHER PUBLICATIONS

International Search Report issued Feb. 6, 2013, in PCT/EP12/071645 filed Nov. 1, 2012.

*Primary Examiner* — Jared Fureman
*Assistant Examiner* — Emmanuel R Dominique
(74) *Attorney, Agent, or Firm* — Oblon, McClelland, Maier & Neustadt, L.L.P.

(57) ABSTRACT

A method of controlling operation of a hybrid continuous current supply, the current supply including a fuel cell stack, a battery, and a DC/DC converter including an input and an output, the converter input being connected to the fuel cell stack output and the output being connected to a variable load in parallel with the battery, the fuel cell stack being formed of a plurality of electrochemical cells configured to produce electricity from a fuel and an oxidizing gas.

14 Claims, 2 Drawing Sheets

(52) U.S. Cl.
   CPC ... *H01M 8/04567* (2013.01); *H01M 8/04626* (2013.01); *H01M 8/04753* (2013.01); *H01M 16/003* (2013.01); *H01M 16/006* (2013.01); *Y02E 60/50* (2013.01); *Y10T 307/549* (2015.04)

(56) References Cited

U.S. PATENT DOCUMENTS

| | | | |
|---|---|---|---|
| 2004/0079564 A1* | 4/2004 | Tabata | B60K 6/365 180/65.21 |
| 2005/0171659 A1* | 8/2005 | Okazaki | B60L 11/1881 701/22 |
| 2006/0040149 A1* | 2/2006 | Aso | H01M 8/04268 429/428 |
| 2006/0113129 A1* | 6/2006 | Tabata | B60K 6/365 180/65.25 |
| 2008/0257621 A1* | 10/2008 | Saeki | B60L 11/005 180/65.31 |
| 2010/0248053 A1 | 9/2010 | Umayahara et al. | |
| 2010/0332063 A1 | 12/2010 | Saeki et al. | |
| 2011/0111318 A1 | 5/2011 | Bernard et al. | |

\* cited by examiner

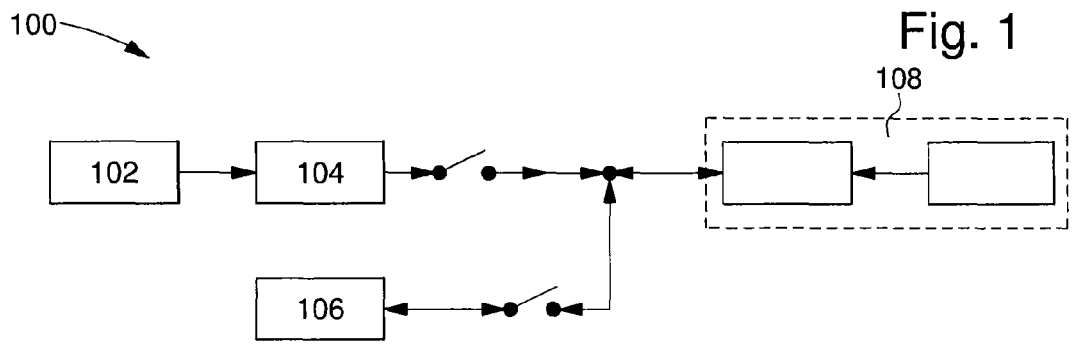
Fig. 1
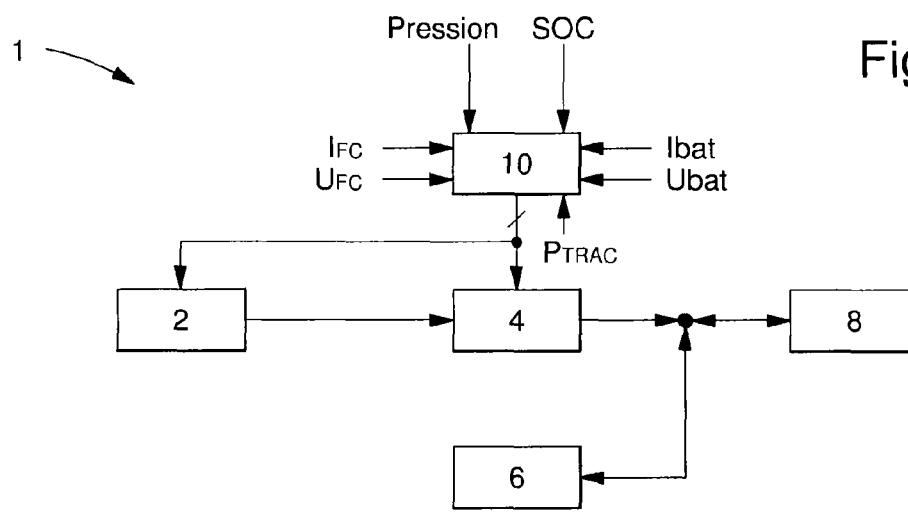
Fig. 2
Fig. 4
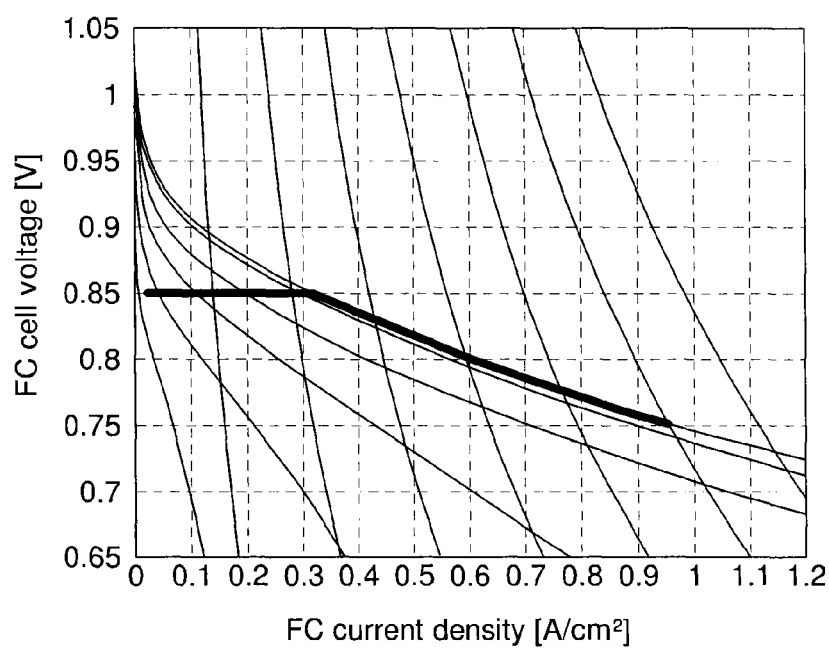

METHOD OF CONTROLLING THE OPERATION OF A HYBRID SYSTEM

CROSS-REFERENCE TO RELATED APPLICATIONS

This is a National Phase Application in the United States of International Patent application PCT/EP2012/071645 filed Nov. 1, 2012 which claims priority on European patent application No. 11187563.9 filed Nov. 2, 2011. The entire disclosures of the above patent applications are hereby incorporated by reference.

The present invention concerns a method of controlling the operation of a hybrid direct current supply, said power supply including a fuel cell stack, a battery and a DC/DC converter comprising an input and an output, the converter input being connected to the fuel cell stack output and the output being connected to a variable load in parallel with the battery, the fuel cell stack being formed of a plurality of electrochemical cells adapted to produce electricity from a fuel and an oxidizing gas.

BACKGROUND OF THE INVENTION

Assemblies of electrochemical units connected in series (often called stacks) are known. The electrochemical units thus assembled may be formed for example by accumulator elements, or by fuel cells. A fuel cell is an electrochemical device for converting chemical energy directly into electrical energy. For example, one type of fuel cell includes an anode and a cathode between which a proton exchange membrane is arranged, often called a polymer electrolyte membrane. This type of membrane only allows protons to pass between the anode and the cathode of the fuel cell. At the anode, diatomic hydrogen undergoes a reaction to produce $H^+$ ions which will pass through the polymer electrolyte membrane. The electrons generated by this reaction join the cathode by a circuit external to the fuel cell, thus generating an electric current. Because a single fuel cell generally only produces a low voltage (around 1 volt), fuel cells are often series-connected to form fuel cell stacks able to generate a higher voltage which is the sum of the voltages of each cell.

When used within the automobile industry, these fuel cell stacks are associated with a battery to form a hybrid system 100. This system connects the fuel cell stack 102 and the battery in parallel so that the fuel cell stack or the battery 106 simultaneously or separately power the car 108, via a common section called the bus. This hybridization also allows the fuel cell stack to recharge the battery which will supply electrical energy to the car. A hybrid system is called "active" when it uses a DC/DC converter 104 connected to the fuel cell stack output 102 as seen in FIG. 1. This DC/DC converter 104 is used to adapt the voltage levels of fuel cell stack 102 and of battery 106 and to regulate the power delivered by fuel cell stack 102.

Regulating power requires the implementation of a control strategy to distribute the power between fuel cell stack 102 and battery 106 according to the power requirement of the electric engine of the car and system constraints. System constraints which the control strategy has to take into account are the maximum voltages and currents of the fuel cell stack and the battery, the temperature ranges which must not be exceeded, the battery state of charge, i.e. for example, the battery must not be charged when it is already 100% charged, etc.

One of the control strategies for this hybrid system consists in regulating the battery state of charge around a nominal value without ever reaching the maximum or minimum charge of said battery. Thus, the battery never needs to be charged externally, since it is recharged by the fuel cell stack and possibly by recuperating kinetic energy from the vehicle when the latter is in a braking phase. This means that the fuel cell stack supplies the mean power consumed by the electric engine of the vehicle, whereas the battery is used as an energy buffer means for charging or discharging energy. This strategy is implemented by regulating the bus voltage at a constant value using the DC/DC converter.

One drawback of this known strategy is that nothing is implemented to prevent the fuel cell stack from operating at open circuit voltage ("OCV"). "Open circuit voltage" means the area of operation in which the voltage per cell is higher than 0.85-0.9 V/cell. This voltage is known to considerably reduce the lifetime of the fuel cell stack. It is therefore undesirable for the fuel cell stack to operate in this mode. At constant pressure, the fuel cell stack operates in open circuit voltage mode when the load current is small.

The open circuit voltage operating mode may occur when a minimum current is imposed on the fuel cell stack at constant pressure. Indeed, this solution avoids the so-called open circuit mode which occurs when the voltage is higher than 0.85-0.9 V/cell. The voltage increases at constant pressure as the current decreases. The current value determines the power value and it is not always possible to consume the power delivered, particularly if it is no longer possible to charge the battery when its state of charge is close to 100%.

Another case able to cause the fuel cell stack to operate in open circuit mode is when the pressure is reduced. Reducing pressure at low power decreases the cell voltage and thus avoids the open circuit mode. However, it must be considered that pressure variation dynamics are much slower than current variation dynamics and a decrease in pressure can only occur if a current is being consumed. The current value directly affects the pressure reduction speed. Thus, if the fuel cell stack power varies instantaneously from several kilowatts to zero kilowatts, it will not be possible to avoid the open circuit mode, since there will no longer be any current to reduce pressure. Likewise, if the fuel cell stack power has to vary quickly from a power of several watts at low pressure to a power of several kilowatts at higher pressure, the pressure must be increased before the current is increased. This method necessarily causes the fuel cell stack to move, for a short instant, into open circuit mode and thus damages said fuel cell stack.

SUMMARY OF THE INVENTION

It is an object of the present invention to provide an operating method for a hybrid system, comprising a fuel cell stack and a battery, which optimises the performance of the hybrid system and increases the lifetime of the fuel cell stack.

The present invention therefore concerns a method of controlling the operation of a hybrid continuous current supply, said supply including a fuel cell stack, a battery and a DC/DC converter comprising an input and an output, the converter input being connected to the fuel cell stack output and the output being connected to a variable load in parallel with the battery, the fuel cell stack being formed of a plurality of electrochemical cells adapted to produce electricity from a fuel and an oxidizing gas, characterized in that said method includes the following steps:

a) Supplying a flow of fuel and a flow of oxidising gas to each of the electrochemical cells;

b) Defining a set point representative of the power requirement;

c) Monitoring the fuel pressure and the oxidising gas pressure in the fuel cell stack;

d) Monitoring the fuel cell stack output voltage, the fuel cell stack output current and the battery voltage;

e) Varying the fuel cell stack output power by varying the fuel cell stack output current and the pressure in the fuel cell stack via the DC/DC converter;

f) Controlling the operation of said hybrid continuous current supply by applying the following tests:

1) measuring the battery voltage and comparing it to a first predetermined critical value, if the battery voltage exceeds said first predetermined critical value, reducing the fuel cell stack output current and restarting step f), otherwise moving to the second test;

2) measuring the fuel cell stack output current and comparing it to a second predetermined critical value, if the output current drops below said second predetermined critical value, reducing the pressure and restarting step f), otherwise moving to the third test;

3) measuring the fuel cell stack output voltage and comparing it to a third predetermined critical value, if the fuel cell stack output voltage is below said third predetermined critical value, moving to the fourth test, if the fuel cell stack output voltage exceeds said third predetermined critical value, reducing the pressure, measuring the battery voltage and comparing it to a first predetermined critical threshold, if the battery value drops below said first predetermined critical threshold, keeping the fuel cell stack output current constant and restarting step f), otherwise moving to the fourth test and;

4) measuring the battery charge and comparing it to a fourth predetermined critical value, if the battery charge is different from said fourth predetermined critical value, modifying the fuel cell stack output current and restarting said step f) otherwise moving to the first test.

One advantage of the present invention is that it provides a longer lifetime for the fuel cell stack. Indeed, with the strategy of the present invention, the battery voltage and fuel cell stack voltage values are never too high. Consequently, the battery is not liable to reach a value likely to cause it to explode and the cells of the fuel cell stack are never at risk of being damaged. By arranging the hybrid system of the present invention in this way, the present strategy allows for longer utilisation.

Advantageous embodiments of the method of the present invention form the subject of the dependent claims.

In a first advantageous embodiment, step f) includes a fifth test to be performed if the fourth test is successful and which consists in measuring the fuel cell stack output current and comparing it to a second predetermined critical threshold, if said fuel cell stack output current is below said second predetermined critical threshold, increasing the fuel cell stack output current so that it reaches said second predetermined critical threshold and restarting said step f), otherwise increasing the pressure until the maximum pressure value is reached.

In a second advantageous embodiment, in test 4), if the battery state of charge is below said fourth predetermined critical value, increasing the fuel cell stack output current and restarting step f), otherwise decreasing the fuel cell stack output current and restarting said step f).

In another advantageous embodiment, the maximum pressure value is 2.5 bar.

In another advantageous embodiment, the hybrid direct current supply further includes a regulating circuit used for recovering data relating to the operation of the hybrid system and used for sending control signals to the fuel cell stack and to the DC/DC converter.

BRIEF DESCRIPTION OF THE DRAWINGS

The objects, advantages and features of the hybrid system according to the present invention will appear more clearly in the following detailed description of at least one embodiment of the invention, given solely by way of non-limiting example and illustrated in the annexed drawings, in which:

FIG. 1 is a schematic view of a known hybrid system;

FIG. 2 is a schematic view of the electrochemical system operating according to the first operating mode of the present invention.

FIG. 4 shows the operating points of the fuel cell stack during operation according to the method of the present invention.

DETAILED DESCRIPTION OF THE INVENTION

Figure 3:
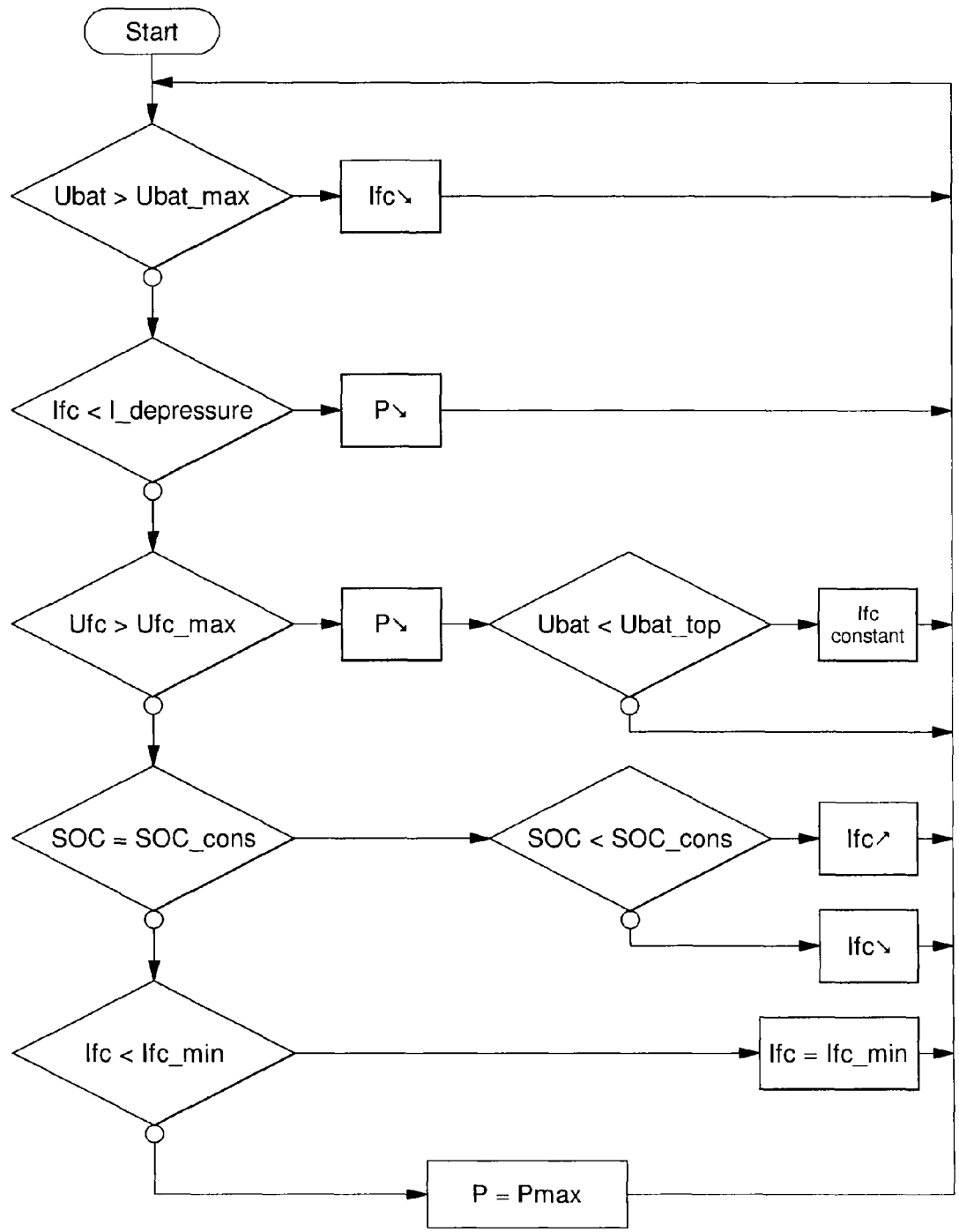
FIG. 3 shows the operating diagram of the fuel cell stack during operation according to the method of the present invention.

In the following description, all those parts of the fuel cell stack that are well known to those skilled in this technical field will be described only in a simplified manner.

FIG. 2 shows a schematic view of a hybrid system 1 according to the present invention. This hybrid system 1 includes a fuel cell stack 2, i.e. a plurality of series-mounted electrochemical cells. This fuel cell stack 2 is powered by a reducing fuel such as hydrogen and by an oxidising agent such as oxygen. The reaction between the reducing fuel and the oxidising agent generates the fuel cell voltage. The water derived from the reaction between the reducing fuel and the oxidising agent may be evacuated via recirculation circuits equipped with recirculation pumps. Hybrid system 1 also includes a means of storing energy 6 such as one or several batteries or supercapacitors. In the remainder of the description, this means of storing electrical energy will be assumed to be a battery 6 but there is nothing to prevent several batteries being used. This battery 6 provides a battery voltage and is connected in parallel to fuel cell stack 2 so that fuel cell stack 2 and battery 6 are both connected to a variable load 8. This variable load 8 may be, for example, a car engine.

This hybrid system 1 also includes a DC/DC converter 4 comprising an input unit and an output unit. The outputs of fuel cell stack 2 are connected to the input unit of DC/DC converter 4, which therefore means that the voltage supplied by fuel cell stack 2 enters DC/DC converter 4. The connection points of variable load 8 and of battery 6 are connected to the output unit of DC/DC converter 4. It will be clear that the input unit includes several inputs and the output unit includes several outputs.

DC/DC converter 4 is also arranged to control hybrid system 1 since DC/DC converter 4 is capable of adapting the voltage level by controlling the current of fuel cell stack 2. Likewise, the DC/DC converter can regulate the power delivered by fuel cell stack 2.

Indeed, the role of DC/DC converter 4 is to control hybrid system 1 so that battery 6 and fuel cell stack 2 operate together to power load 8. The function of the DC/DC converter is also to distribute the power supplied by the fuel cell stack between the load, which is the engine in an automobile application, and the battery. The control of hybrid system 1 is of course subject to constraints, which are the voltage and current limits of fuel cell stack 2, the voltage and current limits of battery 6, the state of charge limits of battery 6, the temperature limits that must not be exceeded etc.

Hybrid system 1 further includes a regulating circuit 10 seen in FIG. 2 and used for recovering data relating to the operation of hybrid system 1 which is also used for sending control signals to fuel cell stack 2 and to DC/DC converter 4. Data relating to the operation of hybrid system 1 includes the voltage and current set points of the fuel cell stack and of battery 6 in addition to the power set points and all the measured data, i.e. the voltages and currents of battery 6 and of fuel cell stack 2, pressure P in the fuel cell stack and the power generated by said hybrid system. The signals sent by regulating circuit 10 to fuel cell stack 2 are used to vary pressure P. The signals sent by the regulating circuit to DC/DC converter 4 are used to vary the voltage by controlling the current of fuel cell stack 2.

Fuel cell stack 2 is characterized by its cell voltage curve according to current and pressure. FIG. 4 shows that the fuel cell stack voltage varies according to the current and more particularly that the cell voltage decreases as the current increases, i.e. as power $P_{TRAC}$ increases. It is noted that at a very low current, the cell voltage is high and liable to damage said cells. This cell voltage to current curve is also characterized in that it depends on pressure P. Indeed, for each pressure value, there is a cell voltage to current curve. It is noted that for a given current, the cell voltage increases with pressure P. Consequently, the increase in pressure P provides higher power. Hence, it is possible to select the operating point by varying current Ifc and pressure P.

The desired strategy consists, when hybrid system 1 consumes low power, in having a cell voltage Ufc which is regulated to a determined value. This operation is required since the cell voltage Ufc to current Ifc curve according to pressure P shows that it cell voltage Ufc can be maximal at low power (i.e. at a low current). It is therefore necessary to regulate cell voltage Ufc by acting on current Ifc and pressure P. At high power, since cell voltage Ufc decreases according to current Ifc, cell voltage Ufc does not need to be regulated. This control method is derived from the idea consisting in reducing the operating pressure of fuel cell stack 2 at low power to avoid the OCV mode. However, it must be considered that pressure variation dynamics are much slower than current variation dynamics (on the order of a second for pressure P and a millisecond for the current). It must also be considered that a decrease in the pressure P of fuel cell stack 2 can only occur if current is consumed, and the current value directly influences the pressure reduction speed.

For operating hybrid system 1, the present invention proposes to implement a strategy forming the subject of the present invention in order to operate hybrid system in a secure manner while attempting to obtain the longest possible lifetime.

To achieve this, the strategy of the present invention seen in FIG. 3 proposes to satisfy a certain number of criteria by performing a series of tests.

The first criterion specifies that the battery voltage Ubat must be below a first predetermined critical value. This first predetermined critical value is a value selected according to the type of battery 6. This value consists of a critical value beyond which battery 6 risks being overloaded. Overloading battery 6 may damage the battery but more importantly cause a risk of explosion. This risk cannot be envisaged since the type of battery 6 used contains toxic or corrosive products and, more importantly, a battery 6 mounted in a vehicle is liable to cause further damage. This is why this first criterion, which is that of safety, is the most important and it is the criterion which must be satisfied first of all.

The second criterion specifies that the power required by load $P_{TRAC}$ is covered as a matter of priority by fuel cell stack 2. This means that the battery must be used as little as possible and must only make up for the difference in power between the power required by load $P_{TRAC}$ and the maximum power delivered by the battery to fuel cell stack 2. This criterion allows battery 6 to be given an optimum size so that it only delivers the minimum necessary power. This means that battery 6 is capable of delivering at least the difference in power between the maximum power delivered by fuel cell stack 2 and the maximum power required by the load.

The third criterion specifies that the fuel cell stack output voltage Ufc is regulated so that it does not exceed a third predetermined critical value. Indeed, the voltage of each cell in a fuel cell stack 2 must not exceed a certain value otherwise the cells will be damaged. Damage to the cells leads to a decrease in the lifetime of the fuel cell stack and a deterioration in its performance. This voltage Ufc may be the voltage of each of the cells or the total output voltage of the fuel cell stack.

The fourth criterion consists in keeping the charge level SOC of the battery at a desired constant level.

In order to satisfy these four criteria, the strategy according to the present invention provides, via the regulating circuit, for five tests to be performed to satisfy the defined criteria. These five tests consist in making measurements in parallel and then comparisons in series. This means that, at a given instant, all the measurements necessary for the various tests are made. Then the tests are performed. These tests are defined such that, if the test condition is satisfied then an action is performed to correct and repeat the test or the entire process, and if the condition of the test is not satisfied, then the next test is performed. Since these tests are performed in order of importance, it is ensured that the most important criterion is always satisfied.

The first test consists in testing battery voltage Ubat to see whether the battery voltage exceeds a first predetermined critical value Ubat_max. This predetermined critical value Ubat_max is selected according to the battery. For the present case, this limit is set at 288V since the battery used has a maximum voltage of 350V and the first predetermined critical value Ubat_max is selected to allow for a margin of manoeuvre. If the first predetermined critical value is exceeded, this means that the battery is receiving too much current from the load. It is thus clear that the power delivered by the fuel cell stack is too high. If this voltage condition is confirmed, the regulating circuit then sends a signal to DC/DC converter 4 and the converter reduces the fuel cell stack output current value Ifc. This reduction in current Ifc causes a reduction in the power of fuel cell stack 2. Subsequently, new measurements are made and the first test is repeated. Indeed, since this is the test representing the most important criterion, it is essential for this criterion to be validated to enable the other criteria to be satisfied. If this voltage condition is not confirmed, i.e. the battery voltage does not exceed the first predetermined critical value Ubat_max, then the second test is performed.

The second test consists in checking whether the fuel cell stack output current Ifc drops below a second predetermined critical value I_depressure in order to subsequently adjust the fuel cell stack output voltage Ufc. Indeed, at maximum pressure P, there exists a fuel cell stack current value Ifc, called the second predetermined critical value I_depressure, below which the fuel cell stack output voltage Ufc becomes higher than a threshold value, here 0.85V, which may damage the cells of the fuel cell stack and reduce their lifetime.

Thus, in the case where output current Ifc of fuel cell stack 2 drops below this second predetermined critical value I_depressure, pressure P in fuel cell stack 2 is decreased which decreases the fuel cell stack output voltage Ufc. This test may also be performed by comparing the fuel cell stack output voltage Ufc to the voltage equivalent of the second predetermined critical threshold. This equivalent is the voltage Ufc of fuel cell stack 2 for a maximum pressure Pmax and for a current Ifc equal to the second predetermined critical threshold. If the second test is negative, i.e. the output current Ifc of fuel cell stack 2 is higher than the second critical threshold, then the third test is performed. Otherwise, the preceding tests are repeated until the test condition is satisfied. The third test consists in checking whether the fuel cell stack output voltage Ufc exceeds the third predetermined critical value Ufc_max and then comparing the battery voltage to a fourth predetermined critical value. Indeed, if the fuel cell stack output voltage Ufc exceeds the third predetermined critical value Ufc_max, there exist two means of lowering said voltage: either the fuel cell stack output current Ifc must be decreased, or the pressure P in fuel cell stack 2 must be decreased. If the battery voltage Ubat is below a first predetermined critical threshold, battery voltage Ubat does not therefore exceed the first predetermined critical value Ubat_max of the first test. The output current Ifc of fuel cell stack 2 does not therefore need to be decreased. Pressure P should then be lowered to decrease the fuel cell stack output voltage Ufc. This then protects the cells of fuel cell stack 2 from excessive voltage without decreasing the charge of battery 6 since the fuel cell stack output voltage Ifc does not vary.

This third test therefore consists in comparing the cell output voltage Ufc of fuel cell stack 2 to a third predetermined critical threshold. If the cell output voltage of the fuel cell stack is higher than the predetermined third critical threshold, the pressure is reduced and the battery voltage is compared to a fourth critical threshold. If the battery voltage is lower than the fourth critical threshold, the current is kept constant and the preceding tests are then repeated. If the battery voltage is higher than the fourth critical threshold, the current is left alone and the preceding tests are then repeated.

The fourth test consists in checking the battery state of charge SOC and in modifying the value of fuel cell stack output current Ifc accordingly. Indeed, the battery state of charge SOC is dependent on the battery output current Ifc so that if current Ifc increases, the battery state of charge SOC increases. It is important for the state of charge SOC not to be too high so that the battery can take high current returns. Thus state of charge SOC is compared to a fourth predetermined critical value SOC_cons which represents the required state of charge SOC. If state of charge SOC is different from this fourth predetermined critical value SOC_cons, then the regulating circuit determines whether state of charge SOC is lower than or higher than said fourth predetermined critical value SOC_cons. If the state of charge SOC is below said fourth predetermined critical value SOC_cons, the regulating circuit gives the order to increase the fuel cell stack output current. Conversely, if the state of charge SOC is above said fourth predetermined critical value SOC_cons, the regulating circuit gives the order to decrease the output current Ifc of fuel cell stack 2. The result of the test is unimportant, i.e whether the state of charge is or is not equal to said fourth predetermined critical value SOC_cons, the tests will be repeated in their entirety. The state of charge SOC will be arranged to be between 0.6 and 0.8, i.e. battery 6 is between 60% and 80% charged and the state of charge never exceeds 0.9 namely 90%.

In a variant, a fifth test is performed. This fifth test consists in monitoring the fuel cell stack output current so that the current never drops below a second predetermined threshold Ifc_min. Indeed, the current characteristic according to pressure P and fuel cell stack voltage Ufc demonstrates that, to reduce output voltage Ufc of fuel cell stack 2, pressure P must be decreased before decreasing current Ifc. Pressure P is reduced first before current Ifc because the reduction in pressure P, at a constant current Ifc, decreases the fuel cell stack output voltage Ufc, the reduction in current Ifc causing the value of output voltage Ufc of fuel cell stack 2 to rise. Minimum current Ifc is the current at which, with pressure P at a minimum, there is obtained a fuel cell stack output voltage Ufc equal to the third predetermined critical value. Below this second threshold Ifc_min, voltage Ufc thus increases exponentially and this risks damaging the fuel cell stack.

If this current condition is not observed, i.e. the fuel cell stack current Ifc is higher than the second threshold Ifc_min, then this means that all the defined criteria are satisfied and the system is operating in an optimum manner. Consequently, fuel cell stack 2 can operate at full speed and to achieve this, the pressure is increased until maximum pressure is obtained. This means that fuel cell stack 2 can potentially reach maximum power.

Subsequently, the process starts again, i.e. new measurements are made and the tests are performed again.

It will be clear that various alterations and/or improvements and/or combinations evident to those skilled in the art may be made to the various embodiments of the invention set out above without departing from the scope of the invention defined by the annexed claims.

The invention claimed is:

1. A method of controlling operation of a hybrid continuous current supply, the current supply including a fuel cell stack, a battery, and a DC/DC converter including an input unit and an output unit, the converter input being connected to an output of the fuel cell stack and the converter output being connected to a variable load in parallel to the battery, the fuel cell stack being formed of a plurality of electrochemical cells configured to produce electricity from a fuel and an oxidizing gas, the method comprising:
   a) supplying a flow of fuel and a flow of oxidizing gas to each of the electrochemical cells;
   b) defining a set point representative of a power requirement;
   c) monitoring a fuel pressure and the oxidizing gas pressure in the fuel cell stack;
   d) monitoring a fuel cell stack output voltage, a fuel cell stack output current, and a battery voltage;
   e) varying a fuel cell stack output power by varying the fuel cell stack output current and pressure in the fuel cell stack via the DC/DC converter;
   f) controlling an operation of the hybrid continuous current supply by applying following tests 1)-4):
      1) measuring the battery voltage and comparing the battery voltage to a first predetermined critical value, if the battery voltage exceeds the first predetermined critical value, reducing the fuel cell stack output current and restarting f), otherwise moving to a second test 2);

2) measuring the fuel cell stack output current and comparing the output current to a second predetermined critical value, if the output current drops below the second predetermined critical value, reducing the pressure and restarting f), otherwise moving to a third test 3);

3) measuring the fuel cell stack output voltage and comparing the output voltage to a third predetermined critical value, if the fuel cell stack output voltage is below the third predetermined critical value, moving to a fourth test 4), if the fuel cell stack output voltage exceeds the third predetermined critical value, reducing the pressure, measuring the battery voltage, and comparing the battery voltage to a first predetermined critical threshold, if the battery value drops below the first predetermined critical threshold, keeping the fuel cell stack output current constant and restarting f), otherwise moving to the fourth test 4); and 4) measuring the battery state of charge and comparing the battery state of charge to a fourth predetermined critical value, if the battery state of charge is different from the fourth predetermined critical value, modifying the fuel cell stack output current and restarting f), otherwise moving to the first test 1).

2. A control method according to claim 1, wherein f) includes a fifth test 5) to be performed if the fourth test 4) is successful and which includes measuring the fuel cell stack output current and comparing the output current to a second predetermined critical threshold, if the fuel cell stack output current is below the second predetermined critical threshold, increasing the fuel cell stack output current to the second predetermined critical threshold and restarting f), otherwise increasing the pressure until a maximum pressure value is reached.

3. A control method according to claim 1, wherein, in test 4), if the battery state of charge is below the fourth predetermined critical value, the fuel cell stack output current is increased and f) is restarted, otherwise the fuel cell stack output current is reduced and f) is restarted.

4. A control method according to claim 2, wherein, in test 4), if the battery state of charge is below the fourth predetermined critical value, the fuel cell stack output current is increased and f) is restarted, otherwise the fuel cell stack output current is reduced and f) is restarted.

5. A control method according to claim 2, wherein the maximum pressure value is 2.5 bar.

6. A control method according to claim 3, wherein the maximum pressure value is 2.5 bar.

7. A control method according to claim 4, wherein the maximum pressure value is 2.5 bar.

8. A control method according to claim 1, wherein the hybrid continuous current supply further includes a regulating circuit used for recovering data relating to the operation of the hybrid system and used for sending control signals to the fuel cell stack and to the DC/DC converter.

9. A control method according to claim 2, wherein the hybrid continuous current supply further includes a regulating circuit used for recovering data relating to the operation of the hybrid system and used for sending control signals to the fuel cell stack and to the DC/DC converter.

10. A control method according to claim 3, wherein the hybrid continuous current supply further includes a regulating circuit used for recovering data relating to the operation of the hybrid system and used for sending control signals to the fuel cell stack and to the DC/DC converter.

11. A control method according to claim 4, wherein the hybrid continuous current supply further includes a regulating circuit used for recovering data relating to the operation of the hybrid system and used for sending control signals to the fuel cell stack and to the DC/DC converter.

12. A control method according to claim 5, wherein the hybrid continuous current supply further includes a regulating circuit used for recovering data relating to the operation of the hybrid system and used for sending control signals to the fuel cell stack and to the DC/DC converter.

13. A control method according to claim 6, wherein the hybrid continuous current supply further includes a regulating circuit used for recovering data relating to the operation of the hybrid system and used for sending control signals to the fuel cell stack and to the DC/DC converter.

14. A control method according to claim 7, wherein the hybrid continuous current supply further includes a regulating circuit used for recovering data relating to the operation of the hybrid system and used for sending control signals to the fuel cell stack and to the DC/DC converter.

* * * * *